Dec. 2, 1958
O. LUTZ
2,862,407
CHANGE SPEED GEARS
Filed July 3, 1951
4 Sheets-Sheet 2
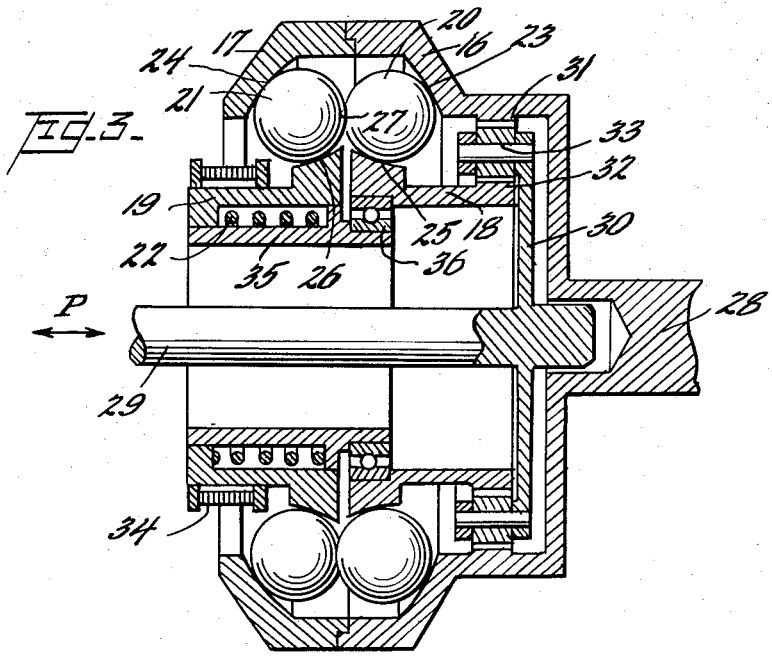
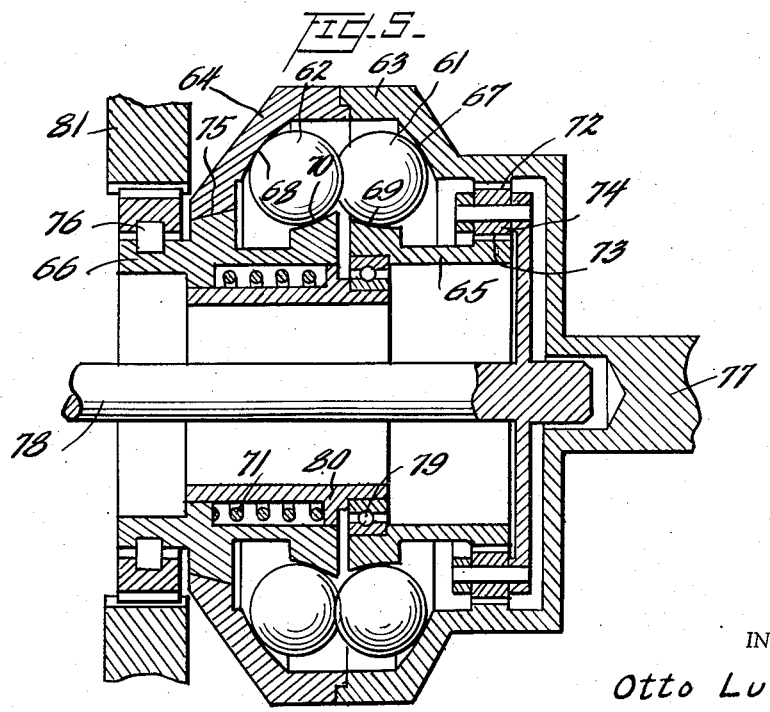
INVENTOR
Otto Lutz
BY
ATTORNEY Dec. 2, 1958  O. LUTZ  2,862,407
CHANGE SPEED GEARS
Filed July 3, 1951  4 Sheets-Sheet 3
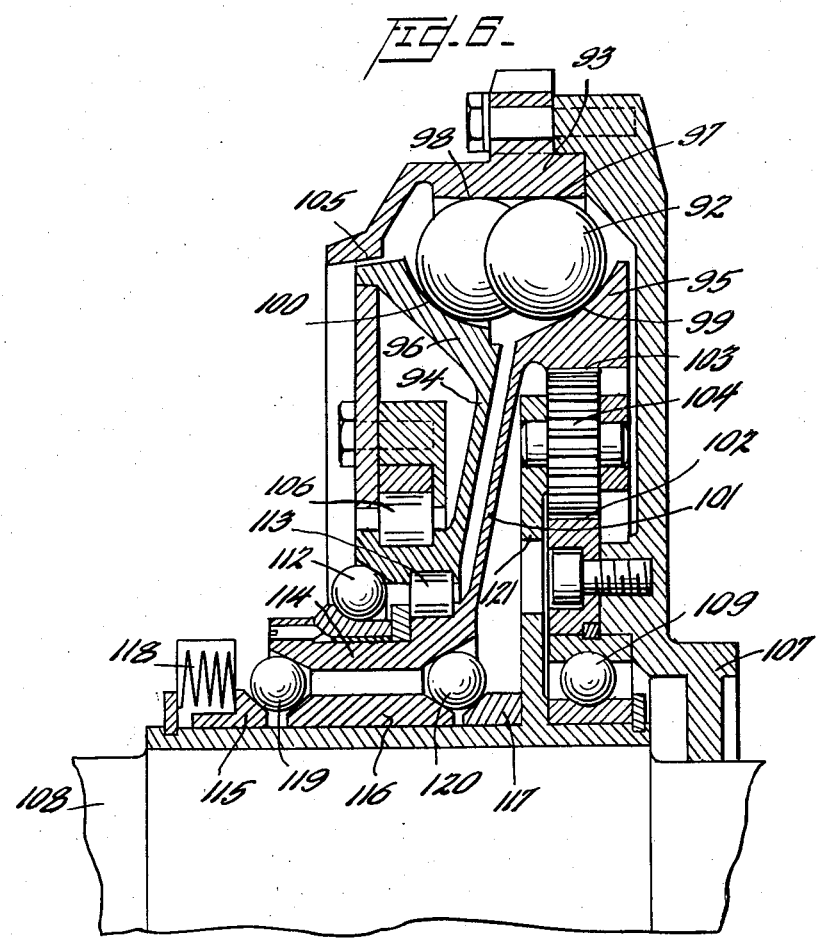
INVENTOR
Otto Lutz
BY
ATTORNEY Dec. 2, 1958 — O. LUTZ — 2,862,407
CHANGE SPEED GEARS
Filed July 3, 1951 — 4 Sheets-Sheet 4
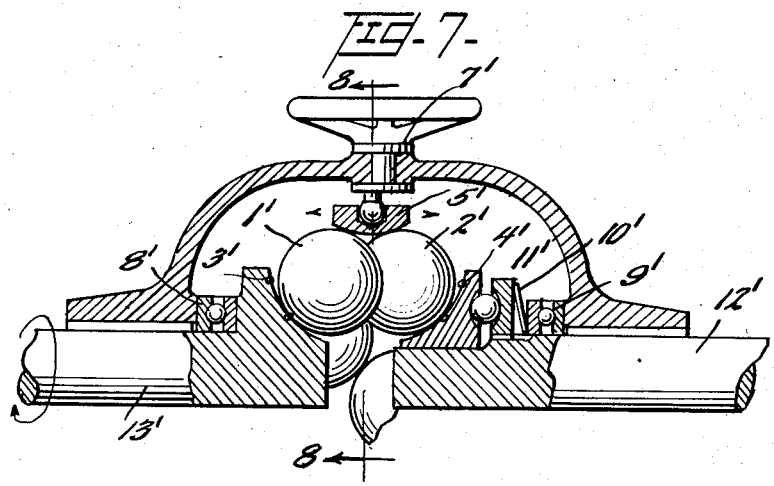
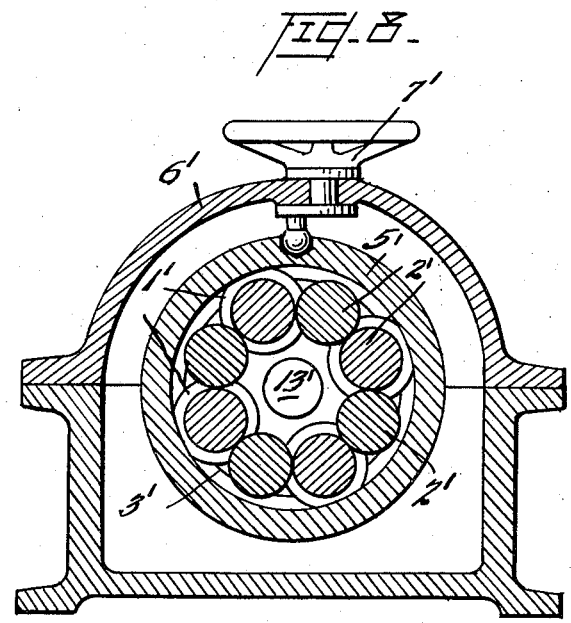
INVENTOR
Otto Lutz
BY
ATTORNEY United States Patent Office 2,862,407
Patented Dec. 2, 1958

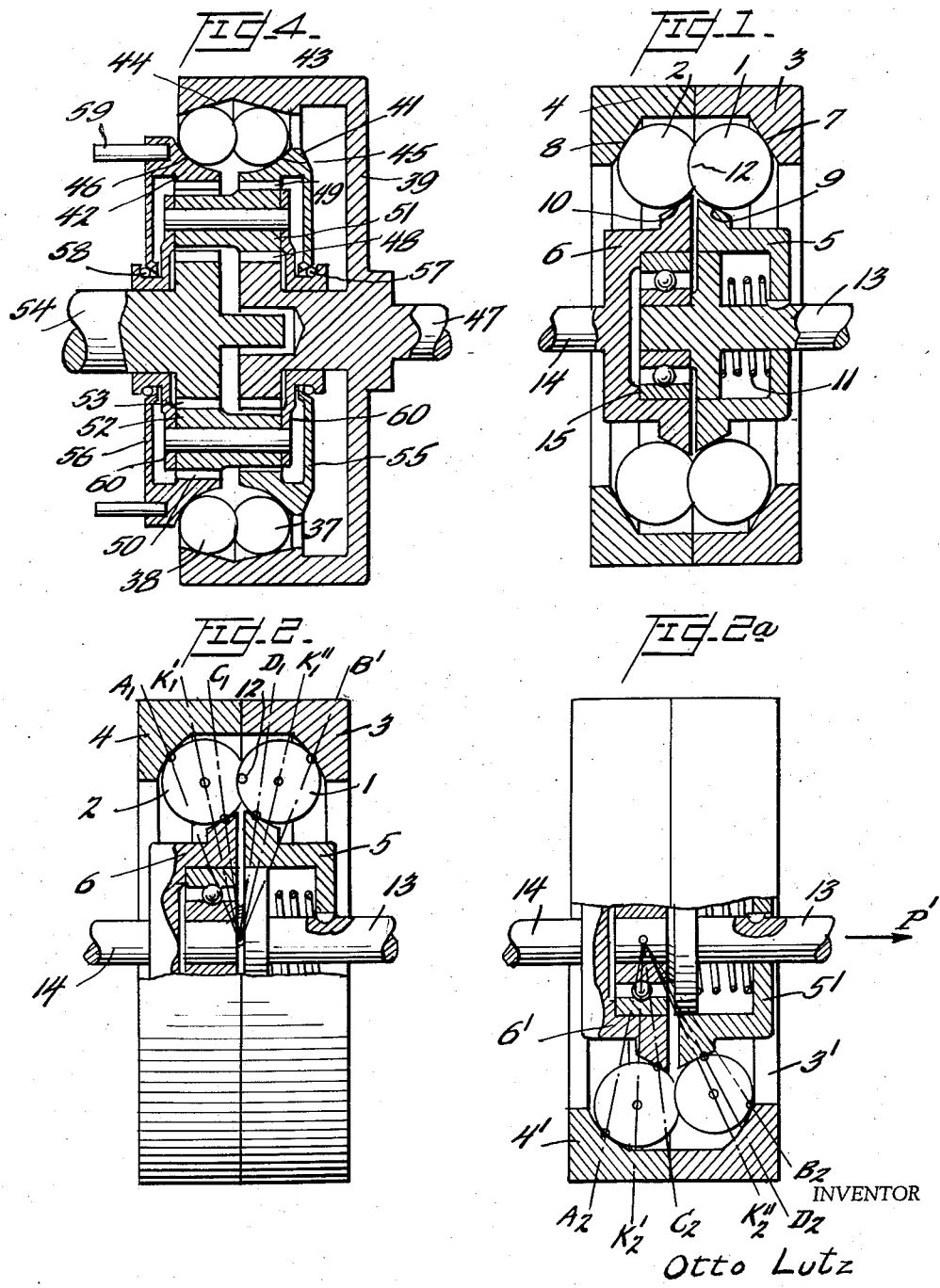

2,862,407

CHANGE SPEED GEARS

Otto Lutz, Braunschweig-Querum, Germany

Application July 3, 1951, Serial No. 234,938

7 Claims. (Cl. 74—796)

The invention relates to a change speed gear in which balls are tensioned between at least three coaxially arranged race rings of which at least one is adjustable in the axial direction with respect to the other race rings. The invention consists in an improvement of such speed change gears and it consists in providing between the race rings a set of two rows of balls, one row relatively displaced with respect to the other and with the balls thereof penetrating into the hollows between the balls of the other row.

The accompanying drawings illustrate several embodiments of the invention diagrammatically and by way of example, in which:

Figure 1 is a longitudinal section showing the basic form of change speed gear with two rows of balls;

Figure 2 is a view similar to Figure 1 explaining the mode of operation of the gear; and Figure 2a shows the parts in a different position;

Figure 3 is a similar sectional view showing a change speed gear in combination with a planet wheel gear set;

Figure 4 is a similar view of a change speed gear in combination with two planet wheel gear sets;

Figure 5 is a similar view of a change speed gear in combination with a coupling;

Figure 6 is a sectional view of a modification of the construction shown in Figure 5 including an axial pressure regulator; Figure 7 is a longitudinal sectional view of a portion of a modified change speed gear; and Figure 8 is a cross section of the change speed gear taken on line 8—8 of Figure 7 in the direction of arrows.

The change speed gear according to Figure 1 is composed of a set of two ball rows 1 and 2, displaced relatively one to the other and with the balls of one set penetrating into the hollows between the balls of the other set, said ball sets running between race rings 3, 4, 5 and 6. A spring 11 causes the balls between the races 7, 8, 9 and 10 of the race rings to be compressed, any two balls having contact at the bearing point 12. The drive is effected for example from the shaft 14 on which the race ring 6 is fixed, and 13 is the driven shaft which carries axially movable but not rotatable thereon, the race ring 5. The race ring 6 is supported on the shaft 13 by a ball bearing 15. The outer rings 3 and 4 are assumed to be stationary and the balls 1 and 2 transmit the torque of the drive shaft to the driven shaft. The magnitude of the transmission ratio is dependent on the size of the angle of inclination of the races 7, 8, 9 and 10 relatively to the axis of rotation. If these races 3, 4 and 5, 6 are inclined in pairs at the same angle, then the drive rotation speed of the change speed gear is equal to the driven rotation speed. If the angles of the races are different, that is non-symmetric, then there is produced a difference in the revolutionary speeds, that is, the transmission ratio becomes greater or smaller than 1. If the gear is to operate in stepless manner, than one or a plurality of the races are formed as roll grooves in which the transition from the outer to the inner race takes place continuously.

The mode of operation of the change speed gear according to Figure 1 is explained with reference to Figures 2 and 2a. These figures show the driving, driven, and rolling points of the balls 1, 2, on the race rings 3, 4, 5 and 6, Figure 2 showing the condition of the race rings when the transmission ratio corresponds to 1:1. In Figure 2a the race ring 5' is shown as shifted in the direction of the arrow P' in such a manner that transmission ratio greater than 1 results. The balls 2 are set in rotary movement by means of the race ring 6 fast on the drive shaft 14, and they roll on the race of the race ring 4 and on the balls 1 at the contact points 12. There results a movement of the balls 2 about the axis $O_1K'_1$ passing through its center and of the ball 1 also about an axis $O_1K''_1$ passing through its center. The line $O_1A_1$ constitutes an envelope line of the rolling cone of the driving side; the line $O_1B_1$ is the corresponding envelope line of the roll cone of the driven side. The line $O_1C_1$ is an envelope line of the drive cone and the $O_1D_1$ is an envelope line of the driven cone. The line $O_1K'_1$ and $O_1K''_1$ constitute the instantaneous axes of the balls 1 and 2. The ratio between the angles $A_1O_1C_1$ and $B_1O_1D_1$ determines the magnitude of the transmission ratio. If the said angles are equal as shown in Figure 2, then the transmission ratio is 1:1.

In the lower half of Figure 2 the race ring 5 (designated as 5') is displaced in the direction of the arrow P. Thereby the position of the balls 1 and 2 between the race rings and relatively to each other is altered so that the apices of the cones of revolution assume the position $O_2$. The position of the point $O_2$ is determined by the condition that the angle between the instantaneous axis of the ball 2 and the envelope line of the corresponding rolling cone is equal to the angle between the instantaneous axis of the ball 1 and the envelope line of the associated rolling cone, that is, that the angle $A_2O_2K_2'$ is equal to the angle $B_2O_2K_2''$. By connecting the corresponding driving, driven, and rolling points of the balls 1 and 2 on the race rings 3', 4', 5' and 6' to the point $O_2$, it will be seen that the angle $A_2O_2C_2$ is no longer equal to the angle $B_2O_2D_2$. The transmission ratio of the gear corresponds then to the ratio between these two angles.

There is no basic modification in the operation of the gear when the rotary race rings 5 and 6 externally surround the ball rows, and the stationary race rings 3 and 4 are disposed internally. It is also possible to make the balls 1 of the one row larger than the balls 2 of the other row.

When the change speed gear of the invention is combined with a planet wheel set it becomes possible to transmit greater powers and to obtain larger transmission ratios. Figure 3 shows an example of such a construction. In this case also there are four race rings 16, 17, 18 and 19 between which are provided a set of two mutually displaced ball rows 20 and 21, the balls of each row penetrating into hollows between the balls of the other row. By means of a spring 22, the said balls are compressed between the race tracks 23, 24, 25 and 26 of the race rings, and each other; point 27 is the contact point between two balls. The drive takes place, for example, from the shaft 28 on which the race rings 16 and 17 are fixed, and 29 is the driven shaft. The shaft 29, however, is not connected directly to the race ring of the gear as shown in Figure 1, but to the planet wheel carrier 30 of the planetary gear set.

The said gear set, contrary to the ball and race ring assembly of the speed change gear proper which hereinafter will be designated as the roll gear set, is so arranged that the drive wheel 31 in the form of an internal toothed ring is fast to the outer race ring 16, while the sun wheel 32 of the planetary gear set forms a unit with the inner race ring.

The race ring 19 sustains the differential torque exerted on the gear casing by the change speed gear and for this purpose, for example, there will be used a band brake or another coupling member 34. A sleeve 35 is provided to support a spring 22 and the race rings 18 and 19 and the race ring 18 is rotatably mounted on a sleeve 35 by means of a ball bearing 36. To understand the operation of the change speed gear according to Figure 3, it is first assumed that the balls 20 and 21 are in symmetric position. Then the race surface 23 must positively effect the same movement as the race 26, that is, when the race 26 is held fixed, then the race 25 remains stationary. In this case, the sun wheel 32 also remains stationary so that only the planet wheel gear set operates in the usual manner.

By axial shifting of the races 25 and 26 in one or the other direction indicated by the double arrow P, the symmetry in the roll gear set is disturbed so that the race 25 and therefore the sun wheel 32 begin to rotate in the same direction as or in the contrary direction to the drive wheel 31 depending upon the direction in which the displacement is effected. For example, if the sun wheel 32 runs in the same direction as the drive wheel 31, then the planet wheel carrier 30 will run faster than before, that is, the transmission ratios is reduced. If the sun wheel 32 runs in the contrary direction, then the planet wheel carrier 30 runs more slowly, that is, the transmission ratio is increased.

In the illustrated combination of the change speed gear with planetary gear set, the change speed gear has to transmit only a portion of the total power, since it takes over only the drive of the sun wheel. By suitable dimensioning of the planet wheel gear this proportion can be larger or smaller. This construction, therefore, is particularly suitable for transmissions which have to transmit high power.

A further advantage of this arrangement consists in that the rotational speed of the balls relatively to the rotary speed of the whole gear assembly is substantially reduced, whereby the centrifugal forces of the balls can be kept small even with high revolutionary speeds and power. Finally, in gears with definite working ranges, for example, in direction drive in case of vehicle change speed gears, the distribution of power can be made in such a way that the roll gear set at the main operation point is only lightly stressed, so that the tensioning force of the balls can be kept small. It is only upon axial displacement in the direction of the arrow P to obtain a different operation point that the balls have to receive additional tensioning to enable them to transmit greater forces. In this manner, the life of the change speed gear is substantially increased. The above described combination of a roll gear set with a planetary gear set is not limited to the construction shown in Figure 3. The race ring with the races 23 and 24 could also be combined with the sun wheel 32 of the planetary gear set. Further, the invention can be used in other combinations, for example, in group transmissions. In the same way, the change speed gear of the invention can be used in gears in which a ball cage is used for torque transmission.

It has already been shown that by mutual axial displacement of the ball tracks in the change speed gear, it is possible to vary the axis of rotation and the angular velocity of the balls, so that a stepless variation of the transmission ratio is possible. To obtain the complete or partial automatic operation of the change speed gear, the hereinafter described means may be adopted. By using obliquely toothed gears in the planet wheel gear set, an axial thrust corresponding to the magnitude of the torque acting on the planet wheel carrier is exerted upon the sun wheel or external wheel driven by the roll gear set, which thrust can be used to effect the mutual axial displacement of the race rings of the roll gear set and consequently to relate the velocity ratio of the gear set functionally with the torque acting on the planet wheel carrier. By suitable dimensioning of the angle of obliquity of the gear teeth on the one hand and the geometric shape of the ball race grooves on the other hand, any desired functional dependency between the torque and gear velocity ratio can be obtained. By applying an additional axial thrust obtained by means of a spring or a corresponding elastic member of suitable characteristic, the characteristic of the gear set can be further modified.

In the combination of the roll gear set with a single planet wheel gear set according to Figure 3, the velocity ratio 1:1 cannot be obtained because the transmission ratio in the roll gear set will then have to rise towards infinity.

The velocity ratio 1:1, however, is very desirable in automotive transmissions. According to a further embodiment of the invention this object is achieved by providing two planet gear wheel sets, one associated with the drive and the other with the driven shaft of the change speed gear. Figure 4 illustrates an example of such an arrangement. The change speed gear with ball rows 37 and 38 and race rings 39, 41 and 42 has its outer ring 39 with ball races 43 and 44 fixed to a drive shaft 47 and a drive sun wheel 48. The internal race rings 41 and 42 carrying ball races 45 and 46 are provided with internal teeth rings 49 and 50. Planet wheels 51 and 52 are journalled in a common planet wheel carrier 53 and mesh groupwise either with the internal teeth 49 of the race ring 41 and the drive sun wheel 48, or with the internal teeth 50 of the race ring 42 and the driven sun wheel 53. The compressing of the balls 37 and 38 is effected by means of an elastic formation of the flanges 55 and 56 of the inner race rings 41 and 42, the axial compressing force being taken up by the shoulders or oblique ball bearings 57 and 58. The stationary inner ring 42 with the ball race 46 sustains the differential torque by means of pins 59 or similar parts on the housing.

In the case of symmetric formation of the gear and symmetric position of the balls, the drive shaft 47 and the driven shaft 54 carrying the drive sun wheel 53 rotate each at equal speeds, since the roll gear set is stationary and the transmission is effected only through the two planet gear sets. When the roll gear set is moved out of the symmetric position by axial shifting of the inner race rings 41 and 42 and their ball races 45 and 46, then the previously stationary race ring 41 with ball race 45 turns either in the direction of rotation of the drive shaft 47 or in the opposite direction. In the former case the driven shaft 54 runs faster and in the second case it runs slower than the drive shaft 47.

In manner similar to that shown in Figure 3 and by using oblique gear teeth in the planet gear set wheels, an axial thrust can be exerted proportional to the driving torque. In this way, an automatically operating gear set can be provided. Similarly, by providing a suitable external pressure the characteristic of the gear set can be varied.

In the construction shown in Figure 3, one race ring is used to sustain the differential torque, and this support can be made capable of release by providing a brake or coupling element. By combining this releasable support with one race ring of the change speed gear it becomes possible, with a velocity ratio of 1:1 to arrange the whole change speed gear as a unit without internal moving part, whereby particularly in the case of automotive transmissions (torque drive) great advantages are obtained. Figure 5 is an example of such a construction. The speed change gear with ball rows 61 and 62, race rings 63, 64, 65 and 66 with ball races 67, 68, 69 and 70, tensioning spring 71 and planet gear wheel set including drive wheel 72, sun wheel 73 and planet wheels 74, and the driving and driven shafts 77 and 78 are similar to those of the modification already shown in Figure 3. According to the invention, however, the outer rings 63 and 64 with the ball races 67 and 68 are provided with a conical coupling surface 75 cooperating with a corresponding conical surface on the inner ring 66 having the ball race 70. This inner ring 66 is also provided with a free wheel mechanism 76 which sustains the differential torque in the housing 81, when the coupling 75 is disengaged.

When the coupling 75 is engaged then the inner ring 66 with the ball race 70 runs at the same speed as the outer drive ring 63 with the ball races 67 and 68. Consequently, also the second inner ring 65 with the ball race 69 and the sun wheel 73, rotate at equal speed, so that the whole gear set runs as a unit without internal relative movement, that is, the velocity ratio is 1:1 providing in the case of an automatic transmission, a direct drive.

When the coupling 75 is disengaged by axial shifting of the inner coupling ring 66, then the differential torque which now occurs in the operation of the change speed gear is supported through the free wheel device by the housing, that is, there is speed reduction between the drive and the driven shafts.

Instead of the conical coupling any other known form of coupling can be used, for example, a disc coupling. The principle of the invention can also be adopted when a change speed gear without auxiliary planet gear set is employed.

Nothing basic is changed in the operation of the change speed gear according to Figure 5 as the rotary race rings 63 and 64 engage the ball rows 61 and 62 internally, and the race rings 65 and 66 externally. Such a speed change gear is shown, for example, in Figure 6 in longitudinal section, only one half being illustrated. It consists of two ball rows 91 and 92, race rings 93, 95 and 96 with ball races 97, 98, 99 and 100 which may be in the form of ball grooves, elastic flange rings 94 and 101 replacing the tensioning spring, the planet gear wheel set with a sun wheel 102 in this case acting as a drive wheel, external gear 103 and planet wheels 104, conical coupling 105, free wheel device 106 which transmits the differential torque to the housing upon disengagement of the coupling 105, drive shaft 107 which, for example, is coupled to the motor, driven shaft 108, ball bearing 109 for a planet wheel carrier 121, the bearing divided into a roller bearing 113 and an oblique ball bearing 112 for supporting the race ring 96. Furthermore, for transmitting the axial thrust and developed according to the shifting of the roll gear set, an axial pressure regulator is provided by means of which the internal forces developed in the gear set are substantially equalized. This regulator consists of ball rows 119 and 120 compressed between race rings 114, 115, 116 and 117, by means of a spring 118 which may consist of one or more elements.

The rolling drive according to the invention of Fig. 6 is composed of two ball rows 91 and 92 and the running surfaces 97, 98, 99 and 100, whereby 97 and 98 are on the common outer ring 93, 99 is on the right-hand race ring 95, and 100 is on the left-hand race ring 96. The balls of the two ball rows 91 and 92 are arranged alternately in the spaces of the adjacent ball rows and by axial movement of the two race rings 95 and 96 (forcing 95 to the left and 96 to the right) all the balls will coincide next to each other and will be pressed against the running surfaces 97, 98, 99 and 100. The rotary axes for the balls $K_1'O$ and $K_1''O$ must be in the shaft axle (point O) whereby for the position of O the condition must be fulfilled that the contact points $C_1$ and $C_2$ on the running surfaces 98 and 97 have the same distance from the axes $K_1'O$ and $K_1''O$. In dependence on the distance of the contact points $A_1$ and $A_2$ on the running surfaces 100 and 99 from the axes $K_1'O$ and $K_1''O$ depends the transmission relationship between the race rings 95 and 96. To simplify the understanding it is assumed that the outer ring 93 is stationary, the balls of the two ball rows 91 and 92 rotate counterclockwise, the two race rings 95 and 96 therefore clockwise. If now the outer ring 93 is moved to the left, then the balls of the ball row 91 will be moved inwardly (toward the shaft axis), the balls of the ball row 92 will be moved outwardly (from the shaft axis), that is the distance of the now inner contact point $A_1$ from the rotary axis $K_1'O$ has become smaller, the distance of the now further outward lying contact point $A_2$ from $K_1''O$ has become larger, the transmission ratio has changed. By suitable comparison of the contours of the contact surfaces 97, 98, 99 and 100 one can attain the result that the axial distance of the race rings 95 and 96 thereby remains the same. It is furthermore possible to form the race surfaces 97, 98, 99 and 100 so that the axially directed components of the pressure force in the contacting points $C_1$ and $C_2$ are equal in opposite directions, thus the outer ring 93 has the same position in axial balance. If one desires a certain driving characteristic of the rolling drive, then in general an axial residual force on the outer ring 93 and a comparative counter force at the two race rings 95 and 96 will remain, to which equalization from the race rings 114, 115, 116 and 117 and the ball bearings 119 and 120 will be assured. For this purpose the ring 117 is axially unmovable relative to the ball bearing 109 and the main disc 107 and the outer ring 93 is connected to the ring 117, also the race ring 115 (apart from its spring adjustment by the pressure spring 118) is slidable, but the race ring 114 is securely mounted and connected with the right race ring 95. If now, as described, the outer ring 93 is moved to the left, or what is equally true, the race ring 95 and the race ring 96 are moved to the left, then the balls of the ball row 119 will move outwardly and the balls of the ball row 120 inwardly. The balls are under the force of the spring 118, one can, in dependence on the formation of the race surfaces, obtain any desired axial force on the race ring 114 and as counter force, on the outer ring 93. Thus the drive, consisting of the main parts 91, 92, 93, 95 and 96, can be operated with any desired axial force characteristic.

The pressing of the ball rows 91 and 92 of the gear drive can be attained either by the use of transmission moments of rotation or by axially operating springs. In Fig. 6, the axial forces of the two race rings 95 and 96 are taken up by a lateral ball bearing 112, whereas the cylindrical roller bearing 113 serves to centralize both discs, the two discs 94 and 101 being elastically constructed to provide for a spring engagement.

In a further construction according to the invention, the described change speed gear may be combined with a planet wheel transmission drive. The planet wheel carrier 121 is secured to the shaft 108 and it carries the planet wheels 104 provided with teeth 103 which mesh inwardly with a sun wheel 102 and with the right race disc 95. The inner sun wheel or gear is secured on the main disc 107 which carries the outer ring 93. If the main disc 107 is driven, as for example, from an internal combustion engine, then the sun wheel or gear 102 and the outer ring 93 will be rotated. If the left race disc 96 is held from rotation, which can take place over the free bearing 106, then in case the gear drive is in its symmetrical condition, transmission ratio 1:1, the right race disc 95 will also be stationary and the planet gear drive will operate to drive the sun wheel and the stationary outer ring.

If now the race discs are adjusted or moved out of their symmetrical positions then the race disc 95 will begin to rotate relative to the main disc 107, that is faster than the shaft 108 or in a counter rotation of the parts the shaft 108 runs at a slower speed, this will result in a change in the transmission ratio between the main disc 107 and the shaft 108.

In connection with a drive for vehicles it is often desired that the transmission ratio of 1:1 between the main disc 107 and the shaft 108 shall be attained and this is entirely possible with the construction according to Fig. 6 in that upon sliding the discs 95 and 96 to the left, the disc 96 will be coupled with the conical coupling 105 with the outer disc so that the outer disc 96 will rotate with the main disc 107. If, however, the outer ring 93 and the left running disc 96 rotate at the same speed, then the balls 91 and 92 will not rotate around their axes $K_1'O$ and $K_1''O$ and the right disc 95 must likewise rotate at the same speed as the members 93 and 96, that is all the parts of the drive will rotate at the same speed as the main disc 107 and they are in a relative position so that there is a drive ratio 1:1. The structure according to the drive gear of Fig. 6 is quite important insofar as the transmission characters are concerned and this is true as the operation of the structure takes place without any frictional losses.

Figures 7 and 8 disclose a change speed gear without any additional elements or parts as shown in Figures 1 to 6. These figures clearly show the two sets of balls 1' and 2' arranged in 2 planes as clearly indicated in Figure 7, and each set of balls has spaces in order to accommodate the balls of the other set. A curved race ring 3' is mounted on a shaft 13' and a further race ring 4' is mounted on a shaft 12'. The race ring 4' is under the influence of a disc spring 10' which contacts the ring member 11' of a ball bearing. Also ball bearings 8' and 9' are provided in order to mount the gear structure in the casing 6'. An outer race ring member 5' is provided which is axially adjustable in the two directions indicated by the arrows and such adjustment is accomplished by means of a hand wheel 7' through the element in the form of a ball pin eccentrically mounted relative to the axis of the rotary hand wheel 7'. By the rotation of the hand wheel 7', the outer race ring 5' is adjusted in a plane parallel to the axis of the gear and by such shifting of the ring 5', the balls 1' and 2' will be adjusted relative to the race rings 3' and 4'.

I claim:

1. A change speed gear comprising three coaxially arranged race rings, balls pressed between said race rings, the balls arranged in two planes as rows at right angles to the axis of rotation of the gear, and the balls of each row having gaps between adjacent balls, said balls of one row penetrating into the gaps between the balls of the other row, so that a ball of one row will contact adjacent balls of the other row and two of the race rings, said race rings arranged so that two of them contact only the balls of one row each and the third race ring contacts all balls of both rows, and said third race ring being movable and adjustable in the axial direction relative to the two other race rings; and means for holding one of said race rings stationary, the other race rings being connected, one to a drive member and the other to a driven member.

2. A change speed gear according to claim 1, in which a planetary gear set is provided so that two of the race rings are coupled respectively with two elements of the planetary gear set, one of said coupled race rings being the stationary race ring and two elements of said gear set being coupled respectively to the driving and the driven members.

3. A change speed gear according to claim 2, one of the race rings being connected to the sun wheel of the gear set and the other race ring being connected to another part of the gear set.

4. A change speed gear according to claim 2, one of the race rings being connected to the sun wheel of the gear set and the other race ring being connected to another part of the gear set, and said third race ring sustaining the differential torque in the combined gear set.

5. A change speed gear according to claim 1, in which an elastic member is provided for one of the races to exert an additional axial pressure externally on the gear.

6. A change speed gear according to claim 1, in which tension means are provided to press the balls of one row against the balls of the other row and against the race rings.

7. A change speed gear according to claim 1, in which at least one of the races of the race rings is formed as a concave race surface.

References Cited in the file of this patent

UNITED STATES PATENTS

| 2,233,967 | Wellton | Mar. 4, 1941 |
| 2,297,744 | Carroll | Oct. 6, 1942 |
| 2,703,992 | Hine et al. | Mar. 15, 1955 |

FOREIGN PATENTS

| 14,211 | Australia | Sept. 5, 1933 |
| 364,024 | Great Britain | Dec. 28, 1931 |
| 440,422 | Germany | Feb. 8, 1927 |